United States Patent
Herati et al.

(12)

(10) Patent No.: US 10,691,007 B2
(45) Date of Patent: Jun. 23, 2020

(54) METHODS AND SYSTEMS OF VIBRATING A SCREEN

(71) Applicant: IMAX THEATRES INTERNATIONAL LIMITED, Dublin (IE)

(72) Inventors: Hamed Herati, Hamilton (CA); Denis Gilles Tremblay, Cambridge (CA); Oliver Nicholas Komarnycky, Kitchener (CA)

(73) Assignee: IMAX Theatres International Limited, Dublin (IE)

( * ) Notice: Subject to any disclaimer, the term of this patent is extended or adjusted under 35 U.S.C. 154(b) by 0 days.

(21) Appl. No.: 15/949,101

(22) Filed: Apr. 10, 2018

(65) Prior Publication Data

US 2018/0231884 A1    Aug. 16, 2018

Related U.S. Application Data

(63) Continuation of application No. 15/161,691, filed on May 23, 2016, now Pat. No. 9,465,284, which is a
(Continued)

(51) Int. Cl.
*G03B 21/56* (2006.01)
*G02B 27/48* (2006.01)
*B06B 1/04* (2006.01)

(52) U.S. Cl.
CPC ............ *G03B 21/562* (2013.01); *B06B 1/045* (2013.01); *G02B 27/48* (2013.01)

(58) Field of Classification Search
CPC .............................. G03B 21/562; G02B 27/48
(Continued)

(56) References Cited

U.S. PATENT DOCUMENTS

| 1,710,922 A | 4/1929 | Forest |
| 1,817,630 A | 8/1931 | Kroesen |

(Continued)

FOREIGN PATENT DOCUMENTS

| CN | 1860411 | 11/2006 |
| CN | 201654430 | 11/2010 |

(Continued)

OTHER PUBLICATIONS

Goodman, Joseph W, Speckle phenomena in optics: theory and applications, 2007, Roberts and Company Publishers, ISBN 0-9747077-9-1. pp. 203-219 (Year: 2007).*

(Continued)

*Primary Examiner* — Christopher E Mahoney
(74) *Attorney, Agent, or Firm* — Kilpatrick Townsend & Stockton LLP

(57) ABSTRACT

Screen vibration systems are provided that can vibrate theatre screens using acoustical, electromagnetic, or another type of energy while reducing the presence of image artifacts that may otherwise be visible as result of vibrating the screen. In one example of a screen vibration system, the system includes a screen, a permanent magnet mounted to the screen, and a magnetic source positioned with respect to the permanent magnet and uncoupled from the screen. The screen is moveable in response to a changing magnetic field from the magnetic source.

20 Claims, 14 Drawing Sheets

Related U.S. Application Data continuation of application No. 14/786,353, filed as application No. PCT/IB2014/061331 on May 9, 2014, now Pat. No. 9,964,844.

(60) Provisional application No. 61/821,311, filed on May 9, 2013.

(58) Field of Classification Search
USPC .......................................................... 359/446
See application file for complete search history.

(56) References Cited

U.S. PATENT DOCUMENTS

| | | | |
|---|---|---|---|
| 1,982,600 | A | 11/1934 | Sponable |
| 2,029,500 | A | 2/1936 | O'Brien |
| 2,348,818 | A | 5/1944 | Jacobsen |
| 3,125,927 | A | 3/1964 | Erban |
| 3,610,728 | A | 10/1971 | Firth |
| 4,155,630 | A | 5/1979 | Ih |
| 4,317,618 | A | 3/1982 | Murakoshi et al. |
| 4,390,239 | A | 6/1983 | Huber |
| 6,122,023 | A | 9/2000 | Chen et al. |
| 6,317,169 | B1 | 11/2001 | Smith et al. |
| 7,593,159 | B2 | 9/2009 | Yokoyama et al. |
| 7,796,330 | B2 | 9/2010 | Sandburg et al. |
| 7,986,457 | B2 | 7/2011 | Kinoshita et al. |
| 8,724,218 | B2 | 5/2014 | Curtis et al. |
| 9,465,284 | B2 * | 10/2016 | Herati ................. G03B 21/562 |
| 2002/0043561 | A1 | 4/2002 | Tsikos et al. |
| 2006/0238743 | A1 | 10/2006 | Lizotte et al. |
| 2007/0035826 | A1 | 2/2007 | Yokoyama et al. |
| 2008/0049315 | A1* | 2/2008 | Morikuni ............... G03B 21/62 359/457 |
| 2008/0117505 | A1 | 5/2008 | Sandburg |
| 2009/0009860 | A1 | 1/2009 | Marshall et al. |
| 2009/0141347 | A1* | 6/2009 | Mehrl .................... G03B 21/56 359/446 |
| 2009/0161980 | A1* | 6/2009 | Wang .................... G06T 7/0002 382/264 |
| 2013/0010356 | A1 | 1/2013 | Curtis et al. |
| 2014/0063600 | A1 | 3/2014 | Sharp et al. |
| 2014/0071406 | A1* | 3/2014 | Manni .................... G02B 27/48 353/31 |
| 2014/0362437 | A1 | 12/2014 | Mcknight et al. |
| 2017/0363946 | A1 | 12/2017 | Tremblay et al. |

FOREIGN PATENT DOCUMENTS

| | | |
|---|---|---|
| CN | 103048799 | 4/2013 |
| CN | 203894525 | 10/2014 |
| CN | 203894526 | 10/2014 |
| CN | 203894527 | 10/2014 |
| CN | 104142602 | 11/2014 |
| CN | 104142602 | 6/2019 |
| FR | 2981464 | 4/2013 |
| JP | 2005107150 | 4/2005 |
| JP | 2007298945 | 11/2007 |
| JP | 2008083687 | 4/2008 |
| JP | 2008191533 | 8/2008 |
| JP | 2010060745 | 3/2010 |
| JP | 2010107995 | 5/2010 |
| JP | 2012118231 | 6/2012 |
| KR | 20000061077 | 10/2000 |
| WO | 2011046035 | 4/2011 |

OTHER PUBLICATIONS

Chinese Application No. 201410199318.7, Office Action dated May 25, 2018, 8 pages (5 pages for the original document and 3 pages for the English translation).
*U.S. Appl. No. 14/786,353, Non-Final Office Action dated Apr. 7, 2017, 12 pages.
*U.S. Appl. No. 14/786,353, Notice of Allowance dated Jan. 5, 2018, 7 pages.
U.S. Appl. No. 15/161,691, Notice of Allowance dated Aug. 26, 2016, 5 pages.
*U.S. Appl. No. 15/161,691, Notice of Allowance dated Jul. 1, 2016, 9 pages.
*Chinese Patent Application No. 201410199318.7, Office Action dated Dec. 28, 2016, 13 pages.
Chinese Patent Application No. 201410199318.7, Office Action dated Sep. 11, 2017, 8 pages.
European Patent Application No. 14795026.5, Extended European Search Report dated Oct. 7, 2016, 7 pages.
Japanese Patent Application No. 2016-512471, Office Action dated Feb. 6, 2018, 7 pages.
International Patent Application No. PCT/IB2014/061331, International Search Report and Written Opinion dated Aug. 28, 2014, 15 pages.
Chinese App. CN201410199318.7 , "Office Action", dated Dec. 14, 2018, 6 pages (English translation included).
European App. 18198991.4 , "Extended European Search Report", dated Jan. 17, 2019, 7 pages.
JP 2016-512471, "Office Action," dated Aug. 21, 2018, (5 pages of English Translation; 7 pages of Japanese translation).
U.S. Appl. No. 15/533,914 , "Non-Final Office Action", dated Sep. 17, 2019, 7 pages.
Chinese Application No. CN201410199318.7 , "Notice of Decision to Grant", dated Mar. 20, 2019, 2 pages.
Japanese Application No. JP2016-512471 , "Office Action", dated Apr. 9, 2019, 5 pages.

* cited by examiner

METHODS AND SYSTEMS OF VIBRATING A SCREEN

CROSS-REFERENCE TO RELATED APPLICATIONS

This is a continuation of U.S. patent application Ser. No. 14/786,353, filed Oct. 22, 2015 and titled "METHODS AND SYSTEMS OF VIBRATING A SCREEN" (Allowed), which is a U.S. national phase under 35 U.S.C. 371 of International Patent Application No. PCT/IB2014/061331, filed May 9, 2014 and titled "METHODS AND SYSTEMS OF VIBRATING A SCREEN," which claims the benefit of U.S. Provisional Application No. 61/821,311, filed May 9, 2013 and titled "METHODS AND SYSTEMS OF VIBRATING A SCREEN", and claims priority to U.S. patent application Ser. No. 15/161,692 (U.S. Pat. No. 9,465,284) and filed May 23, 2016 and titled "METHODS AND SYSTEMS OF VIBRATING A SCREEN", each of which is incorporated herein by reference in its entirety.

TECHNICAL FIELD

The present disclosure relates generally to the field of displaying images and, particularly but non-exclusively, to enhancing displayed laser images.

BACKGROUND

Shaking display screens can enhance displayed images on the screen. Projecting an image on a stationary screen using a coherent light source such as a laser light source can result in visual artifacts (known as speckle) in the image area. By shaking the screen surface on which an image is projected, speckle artifacts can be reduced or eliminated. To ensure speckle is reduced over all of the image area on the screen, all of the screen area is shaken. It can be desirable to have more than one point or source of screen vibration to achieve vibrating all of the image area of the screen. Screens can have a large surface area composed of a material, such as vinyl, that absorbs sufficient vibration energy imparted to the screen that the screen requires multiple vibration locations.

Using multiple sources to vibrate the screen, however, can introduce problems.

SUMMARY

In one example, a method is described for reducing speckle artifacts. A screen is vibrated by a screen vibrator. Information about a projected image on the screen is captured using a sensor. An amount of speck artifacts present in the projected image on the screen is determined from the information. The amount of speckle artifacts present in the projected image on the screen determined from the information is compared to a predetermined threshold. The amount of speckle artifacts is determined to exceed the predetermined threshold. In response to determining that the amount of speckle artifacts exceeds the predetermined threshold, a signal to a controller that drives the screen vibrator is adjusted.

In another example, a projection system includes a projector, a screen vibrator, a controller, a sensor, and a processing unit. The projector is configured for projecting a projected image on a screen. The screen vibrator is positionable with respect to the screen for vibrating the screen. The controller is configured for driving the screen vibrator to vibrate the screen. The sensor is configured for capturing information about the projected image on the screen. The processing unit is configured for determining an amount of speckle artifacts present in the projected image on the screen from the information, comparing the amount of speckle artifacts present in the projected image on the screen from the information to a predetermined threshold, determining that the amount of speckle artifacts exceeds the predetermined threshold, and in response to determining that the amount of speckle artifacts exceeds the predetermined threshold, adjusting a signal to the controller to change a vibration characteristic of the screen vibrator.

In another example, a subsystem for a projection system includes a controller and a processing unit. The controller is configured for driving a screen vibrator positionable with respect to a screen for vibrating the screen. The processing unit is configured for determining an amount of speckle artifacts present in a projected image on the screen from captured information received from a sensor, comparing the amount of speckle artifacts present in the projected image on the screen from the captured information to a predetermined threshold, determining that the amount of speckle artifacts exceeds the predetermined threshold, and in response to determining that the amount of speckle artifacts exceeds the predetermined threshold, adjusting a signal to the controller to change a vibration characteristic of the screen vibrator.

DETAILED DESCRIPTION

Figure 1:
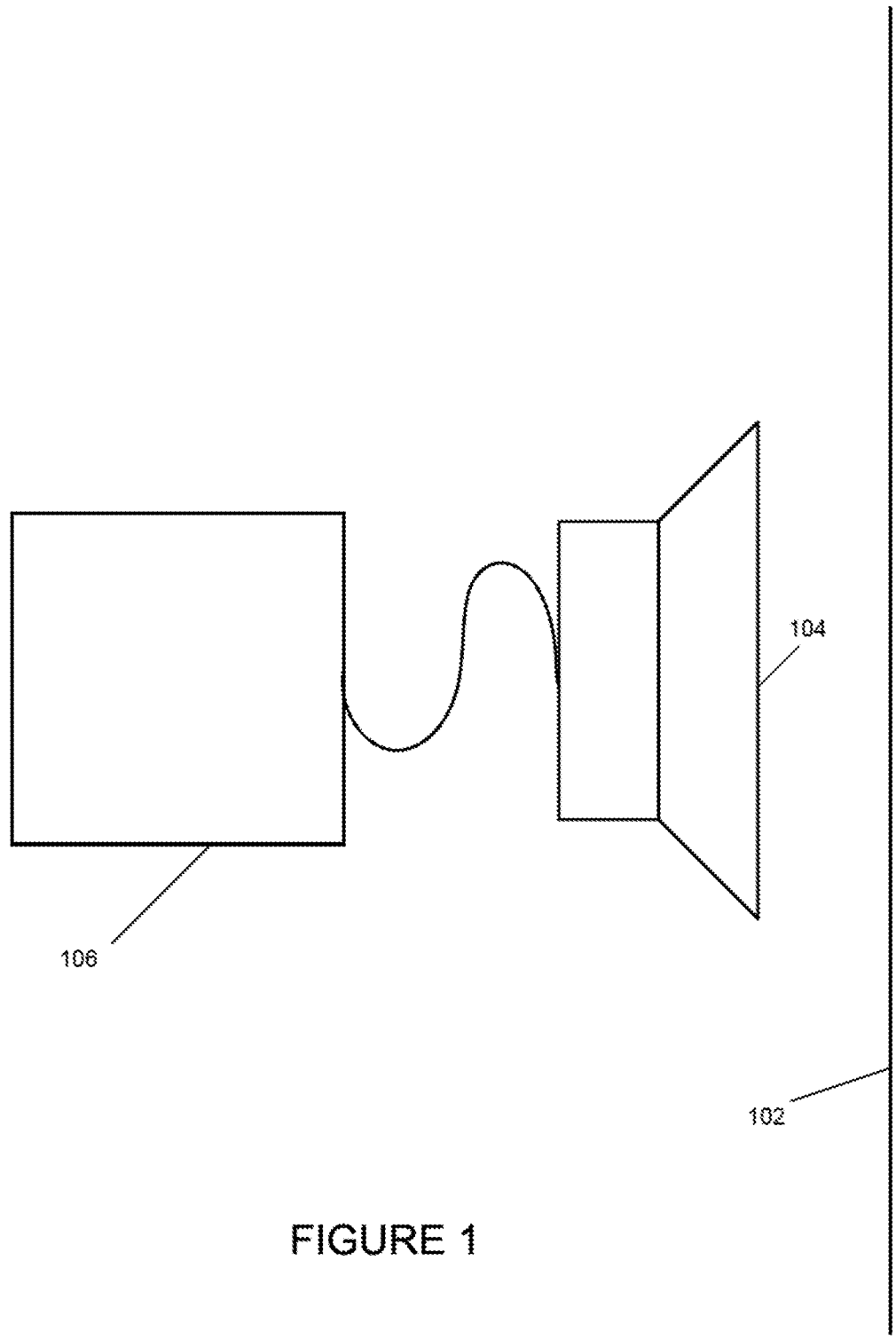
FIG. 1 is a schematic of a system for vibrating a screen according to one example.

Certain aspects, features, and examples of the present disclosure relate to a screen vibration system that can vibrate a theatre screen using acoustical, electromagnetic, or another type of energy while reducing the presence of image artifacts that may otherwise be visible as result of vibrating the screen.

Screens supported by a screen support structure can have a mass in the order of a couple hundred or more kilograms. One approach to shaking the screen is to distribute vibrating sources that can shake the screen over the area of the screen. Applying a small amount of energy to each of the vibrating sources can collectively shake the whole screen.

One challenge can include moving the screen in a way that does not create screen distortion artifact visible by someone in the audience. A screen distortion artifact can be a local physical distortion that is visible on the screen surface and that is inconsistent with other areas of the screen surface. A screen with a high-gain coating on its surface can be susceptible to slight local distortions where a discontinuity in the screen's perceived gain can be recognized when the screen is poked or pulled by devices intended to vibrate the screen. Creating a local physical distortion in the screen position can cause the light reflection of the distorted portion of the screen surface to appear to be inconsistent with light reflected from areas of the screen without the local distortion. Deformations in the screen surface can appear as luminance distribution distortions.

A screen without a vibration system can have a surface profile that is the screen's natural resting state surface profile. A screen can be equipped with a vibration system that does not distort the screen surface profile from its natural resting surface profile. The screen vibration system can avoid exerting a biased force on the screen when the screen vibration system is inactive or not powered on. When the screen vibration system is actively vibrating the screen, the average displacement position of the screen can be the same position of the screen in its natural resting state.

To reduce speckle artifacts, the screen vibrations can avoid creating large screen displacements that can otherwise be visible to a viewer. Displacements can be limited to small amounts in such a way that the screen displacement variation can be unnoticed to the viewer, but the displacement can be sufficient to cause speckle artifacts to be reduced or eliminated. The displacement amplitude of the screen to reduce speckle can vary. For example, the amplitude of the screen displacement can be greater at the location of the screen vibrator, but at a distance further away from the screen vibrator the screen displacement can be less and still reduce speckle artifacts. The frequency of the screen displacement can be above a certain level to avoid the displacement becoming easily perceptible. But the higher the frequency of the screen displacement, the more audible the vibration system may become. There can be a limited range of frequencies and amplitudes of screen displacement that can provide an optimum tradeoff of speckle artifact reduction with minimizing audience perceptibility of the screen being displaced and possible audible noise from vibrating the screen. The range of screen displacement frequencies can be within a range of 10 Hz to 35 Hz, although speckle reduction can still occur using displacement frequencies outside of the range.

The screen surface can be designed to vibrate by making physical contact, for example from behind the screen, with a mechanically vibrating surface. In other examples, the screen is shaken using a non-contact approach. An example of the non-contact approach can be by an acoustical component with an electromechanical acoustical transducer or actuator, such as a loudspeaker, being placed behind the screen and in close proximity to the screen. When the acoustical transducer is activated with a low frequency signal, the transducer can displace the air directly behind the screen to induce screen movement with the same frequency by which a transducer is moving. The acoustical transducer can have a moving cone or diaphragm to displace the air. The frequency of the signal to the acoustical transducer can be above or below the maximum hearing range of a human to avoid audible detection by the audience. The acoustical transducer vibration system can allow the screen surface to rest in a natural state profile when the transducer is not active and can allow the screen to be displaced equally in the two directions when the transducer is active.

FIG. 1 shows one example of a system for screen vibration. The system includes an actuator 104 that can receive a signal from a power supply 106. The actuator 104 is positioned behind a screen 102. The actuator 104 can displace the air directly behind the screen 102 to displace the screen 102 with a frequency of the signal from the power supply 106. In some examples, the actuator 104 is an acoustical actuator.

In another example, an electromechanical acoustical actuator is fit with a baffle to vibrate a screen. FIGS. 2A to 4B are examples of different baffles fitted to the actuator 104 that is positioned to face the screen 102. The actuator 104 can be placed a distance from the screen 102 that is in the range of a one-quarter inch to twenty-four inches. Adding a baffle can cause the air between the screen 102 and the actuator 104 to be influenced by a surface of the actuator 104 that is facing the screen 102 to maximize screen displacement. When the actuator 104 moves air, the air on one side of the actuator 104 experiences a positive compression and the air on the other side of the actuator 104 experiences a negative compression. The displaced air on the two sides of the actuator 104 can be of opposite polarity or 180 degrees out of phase. Displacements of air with opposite polarity that interact can have a net effect of reducing or canceling the net displacement of air. Having a baffle restrict the opposite polarity of displaced air at the surface of the actuator 104 not facing the screen 102 from influencing the air at the screen 102 can prevent an undesirable reduction in air displacement at the screen 102. Beyond the baffle, the displaced air from the front and the back of the actuator 104 can interact and can cause partial or full cancellation at locations further away from the actuator 104 and baffle, such as locations at which an audience viewing the screen can be located.

Figure 2B:
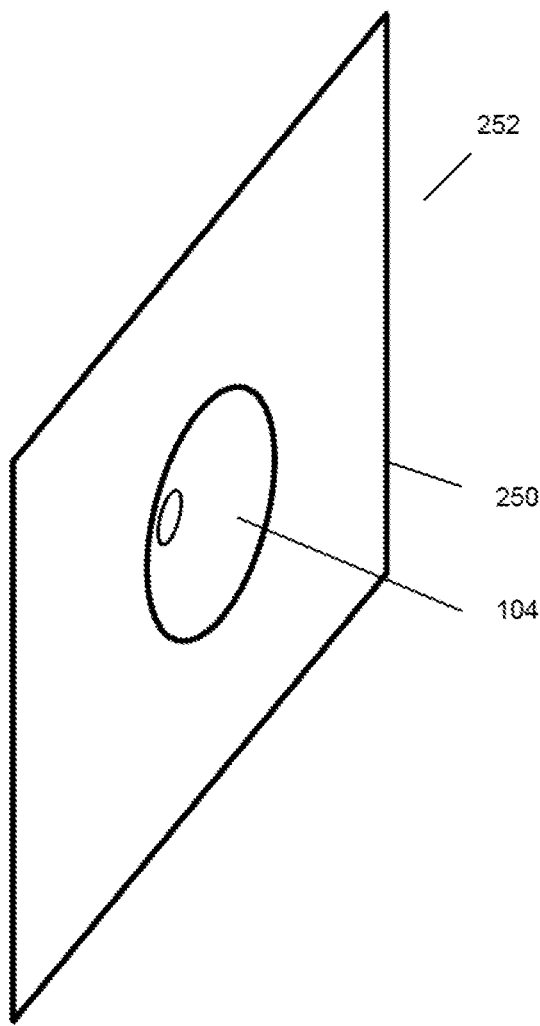
FIG. 2B is a perspective view of the baffle and the actuator of FIG. 2A.
Figure 2A:
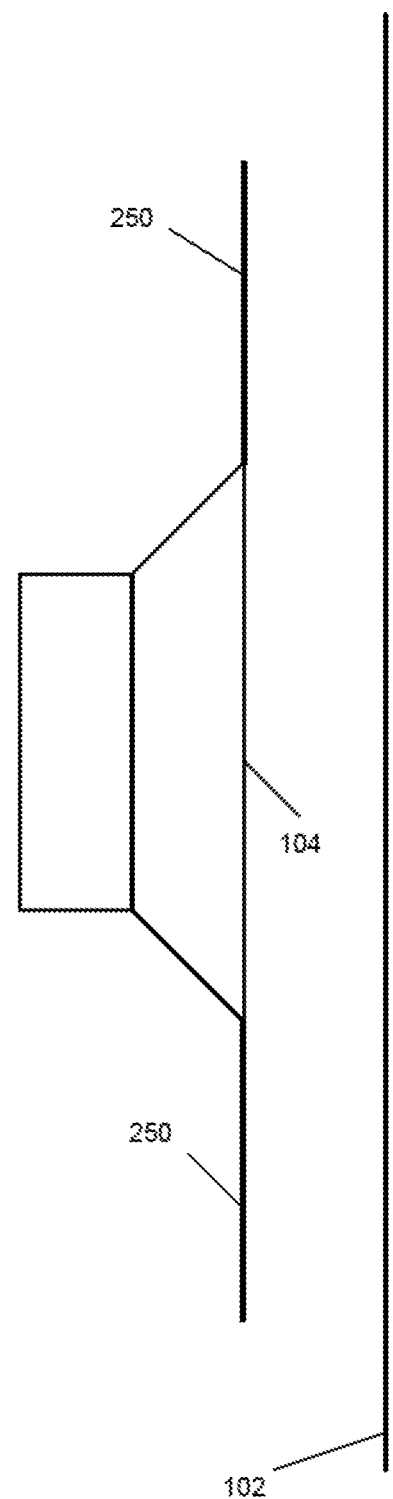
FIG. 2A is a cross-sectional side view of a first example of a baffle with respect to a screen and an actuator for vibrating the screen.

FIG. 2A depicts a cross-sectional side view of a baffle 250. The baffle 250 can be a plate that separates any displacement of air towards the screen 102 caused by the front of the actuator 104 from interacting with the displacement of air that occurs at the back of the actuator 104. The surface of the baffle can be positioned parallel to the screen 102 and normal to an acoustical axis of the actuator 104. The acoustical axis can be a centerline along the direction that air is being displaced by the actuator 104. The actuator 104 can be an acoustical transducer of a configuration used in an acoustical loudspeaker such as an electromechanical transducer with a cone or other diaphragm moved electromechanically. FIG. 2B depicts a perspective view of the actuator 104 and the baffle 250. The face 252 (i.e., the side facing the screen 102) of the baffle 250 and the actuator 104 is shown in FIG. 2B. The baffle 250 can be a stiff material or a dense material to prevent air displacements from flexing the baffle, further reducing any interaction between displaced air in the front and in the back of the actuator 104. The baffle 250 can be rectangular, circular or another shape suitable for a specific implementation.

Figure 3A:
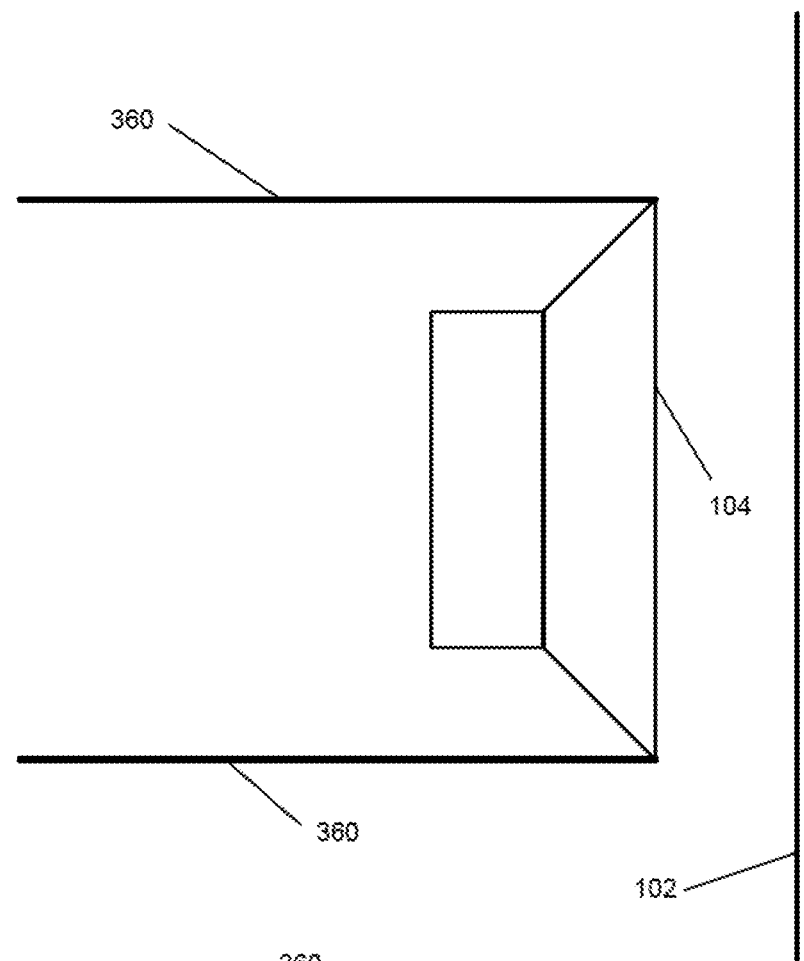
FIG. 3A is a cross-sectional side view of a second example of a baffle with respect to a screen and an actuator for vibrating the screen.
Figure 3B:
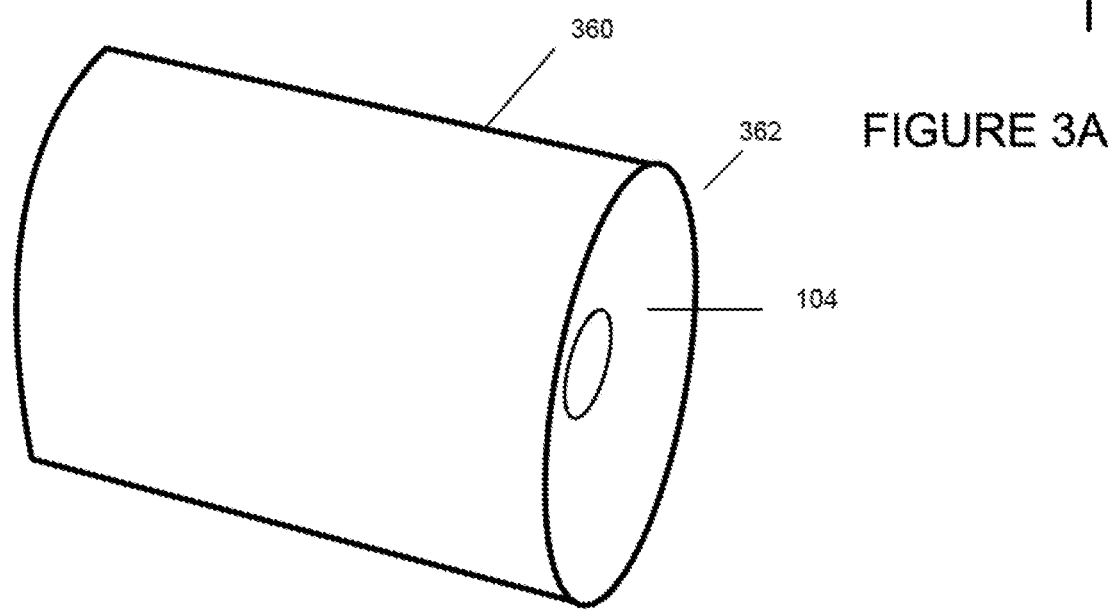
FIG. 3B is a perspective view of the baffle and the actuator of FIG. 3A.

FIG. 3A depicts another example of a baffle 360 by cross-sectional side view. The baffle 360 is tubular, the face 362 is shown by perspective view in FIG. 3B, to separate the displacement of air that occurs between front of the actuator 104 and the back of the actuator 104. The acoustical axis of the actuator 104 can be parallel to an axis of the tubular baffle 360 and at a right angle to the screen 102. The opening of the baffle 360 can be positioned to face the screen 102. The actuator 104 can be an electromechanical transducer with a cone. The baffle 360 can be a stiff material or a dense material. The cross-sectional shape of an opening of the baffle 360 can be rectangular, circular, or another shape suitable for a specific implementation. The baffle 360 can extend behind the actuator 104. In other examples, the baffle 360 can extend in front of the actuator 104 or the baffle 360 can extend behind and in front of the actuator 104.

Figures 4A, 4B:
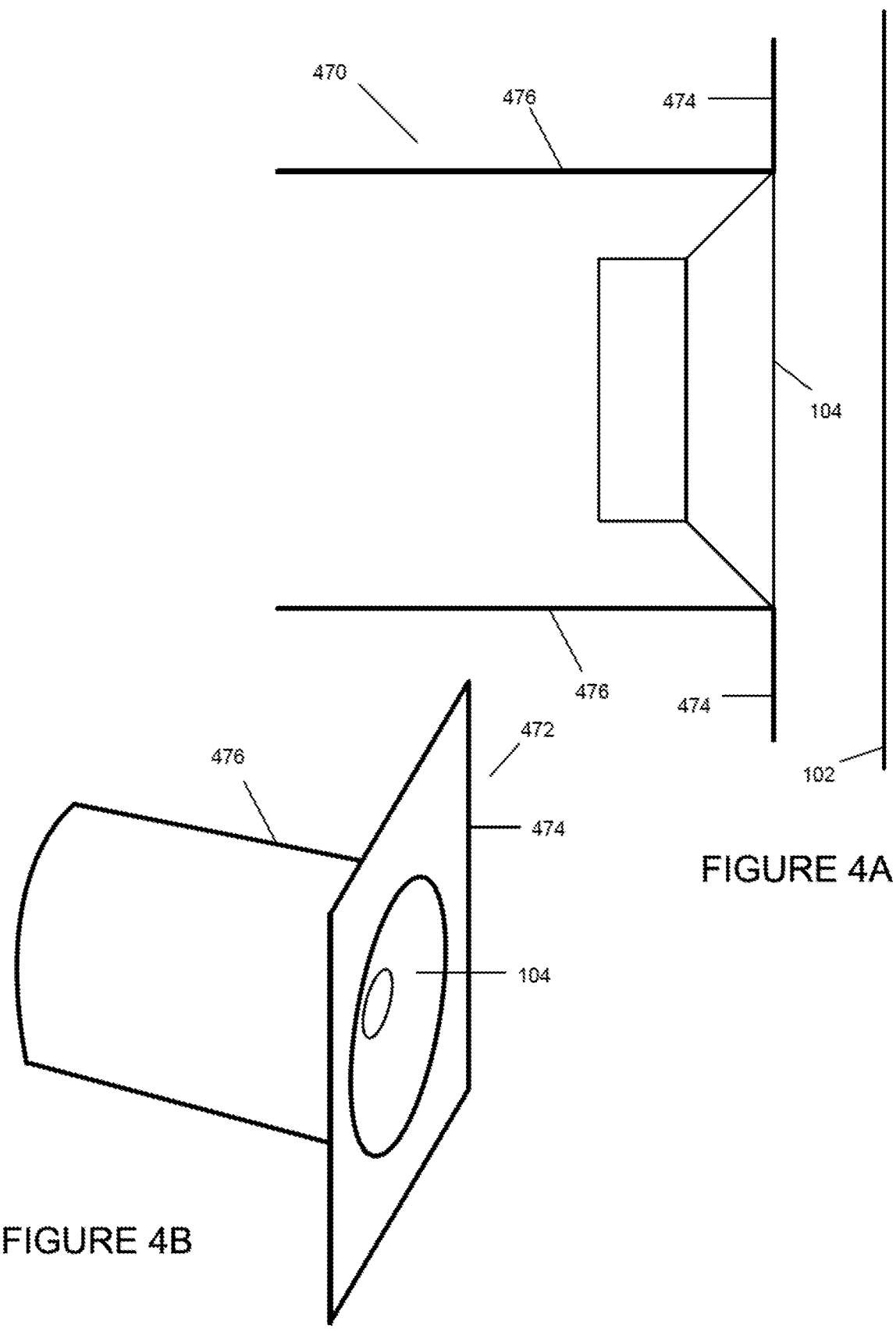
FIG. 4A is a cross-sectional side view of a third example of a baffle with respect to a screen and an actuator for vibrating the screen.
FIG. 4B is a perspective view of the baffle and the actuator of FIG. 4A.

FIG. 4A depicts by cross-sectional side view another example of a baffle 470 that includes a plate 474 and a tubular (or other shaped) structure 476 extending from the plate 474. FIG. 4B depicts a perspective view of baffle 470 and actuator assembly 104 that can be in a face direction 472 toward the screen.

The open baffles described above can allow for vibrating an area of the screen 102 that is in close proximity to the actuator 104 with little cancellation effects yet allowing cancellation effects of the propagating low frequency air disturbances to occur at distances beyond the baffle mounted to the actuator 104.

Another approach to vibrate a screen can include positioning a magnetic source in close proximity to the screen in which a magnetic force can be used to repel and attract an element attached to a back surface of the screen.

Figure 5:
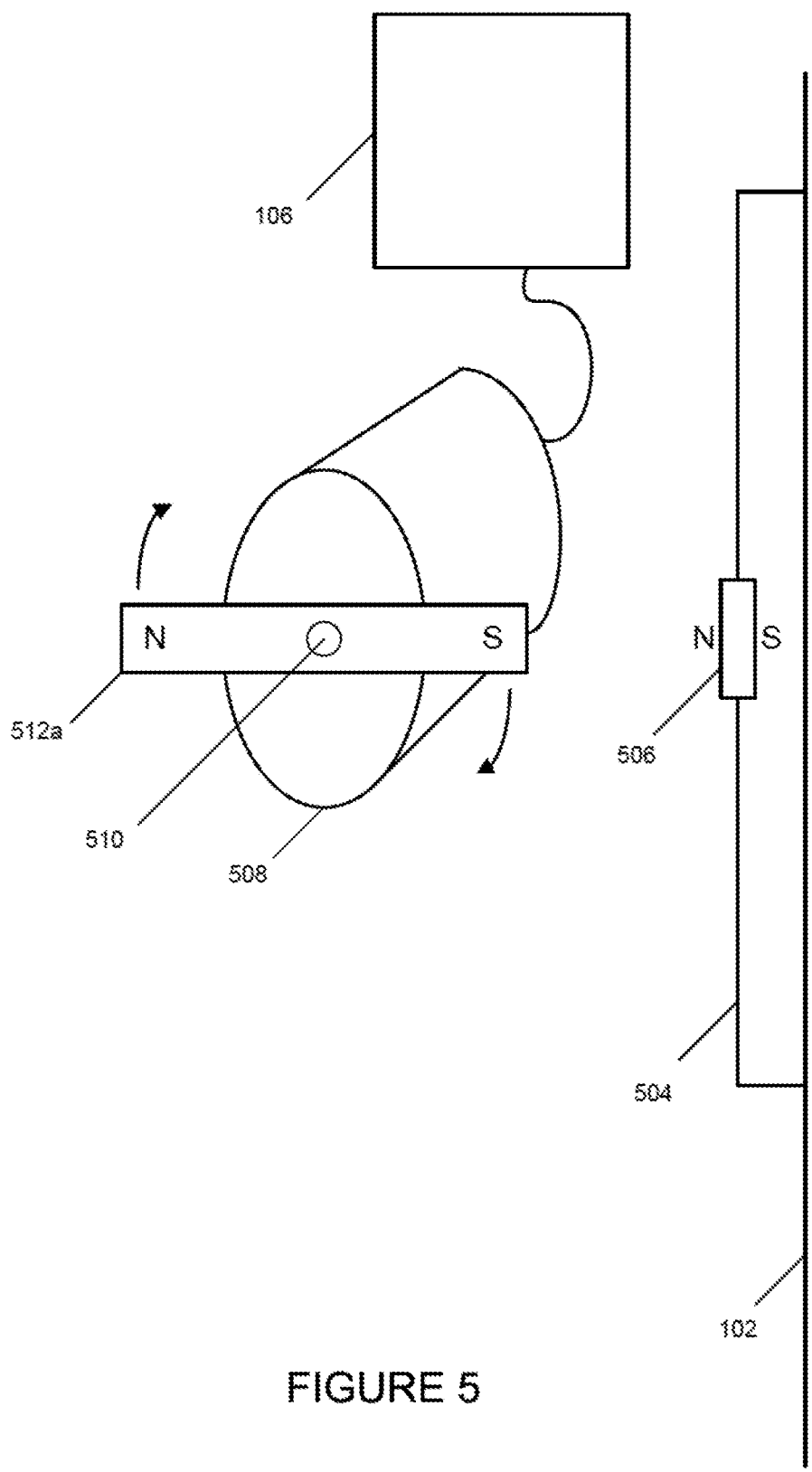
FIG. 5 is a schematic of a screen vibration system that includes a rotatable permanent magnet according to one example.
Figure 6:
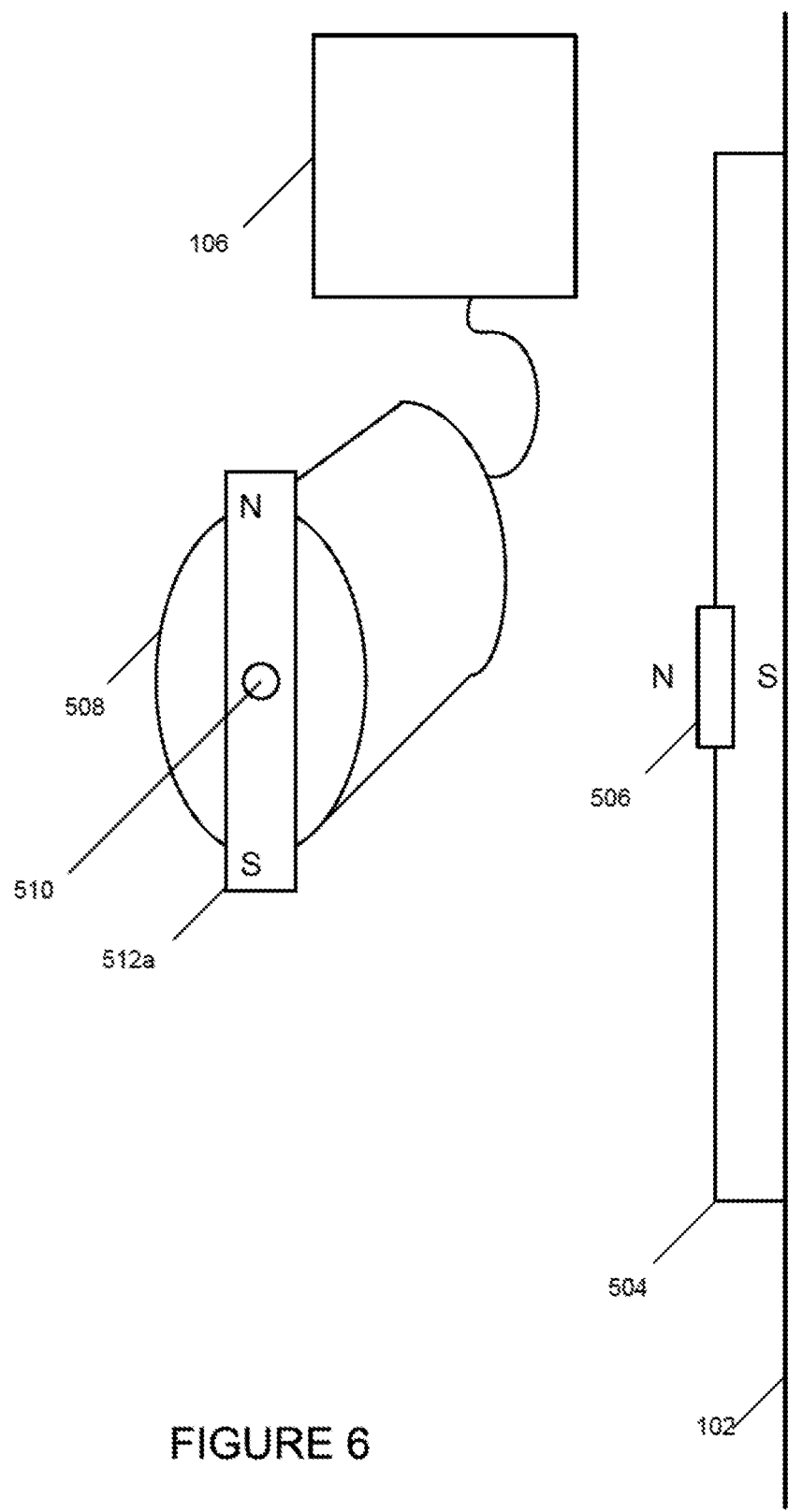
FIG. 6 is a schematic of the screen vibration system of FIG. 5 with the rotatable permanent magnet in a non-vibrating position according to one example.

FIGS. 5 and 6 depict an example of screen vibration using permanent magnets. Mounted onto the screen 102 is a batten 504 with an element 506 that can interact with a permanent magnet 512a. The permanent magnet 512a is mounted to a motor shaft 510 and the permanent magnet 512a can be rotated by the motor 508 with power from a power supply 106. If the element 506 is a permanent magnet with a North/South orientation, as shown, the rotating permanent magnet 512a can push the element 506 outwards when the North pole of the permanent magnet 512a is oriented towards the element 506. When the permanent magnet 512a rotated to be oriented with the South pole positioned next to the element 506, the element 506 can be attracted towards the permanent magnet 512a. If the element 506 is metal that can be influenced by a magnetic field such as iron instead of a permanent magnet, the element 506 may only move towards the permanent magnet 512a regardless of the North or South orientation of the magnetic field facing the element 506. The screen displacement may be only in one direction, e.g., towards the permanent magnet 512a. Having the element 506 as a permanent magnet, however, may be useful if the average screen displacement over time is desired to be close to the natural rest position of the screen. The frequency with which the element 506 moves in and out can be directly proportional to the speed at which the permanent magnet 512a rotates. The rotational rate can be adjusted using the power supply 106 to the desired frequency of vibration. The screen 102, when displaced outwards from the permanent magnet 512a, may have less displacement from the rest position of the screen 102 when the screen 102 is displaced towards the permanent magnet 512a. The system can compensate for the difference by reducing the length of the permanent magnet 512a for the portion that attracts the element 506 such that the outward and inward displacements are equal to achieve equal inwards and outwards screen displacement. When the screen vibration system is not active, the permanent magnet 512a can be positioned as shown in FIG. 6 such that its influence on the element 506 is minimized and the screen 102 remains in a natural rest position.

Figure 7:
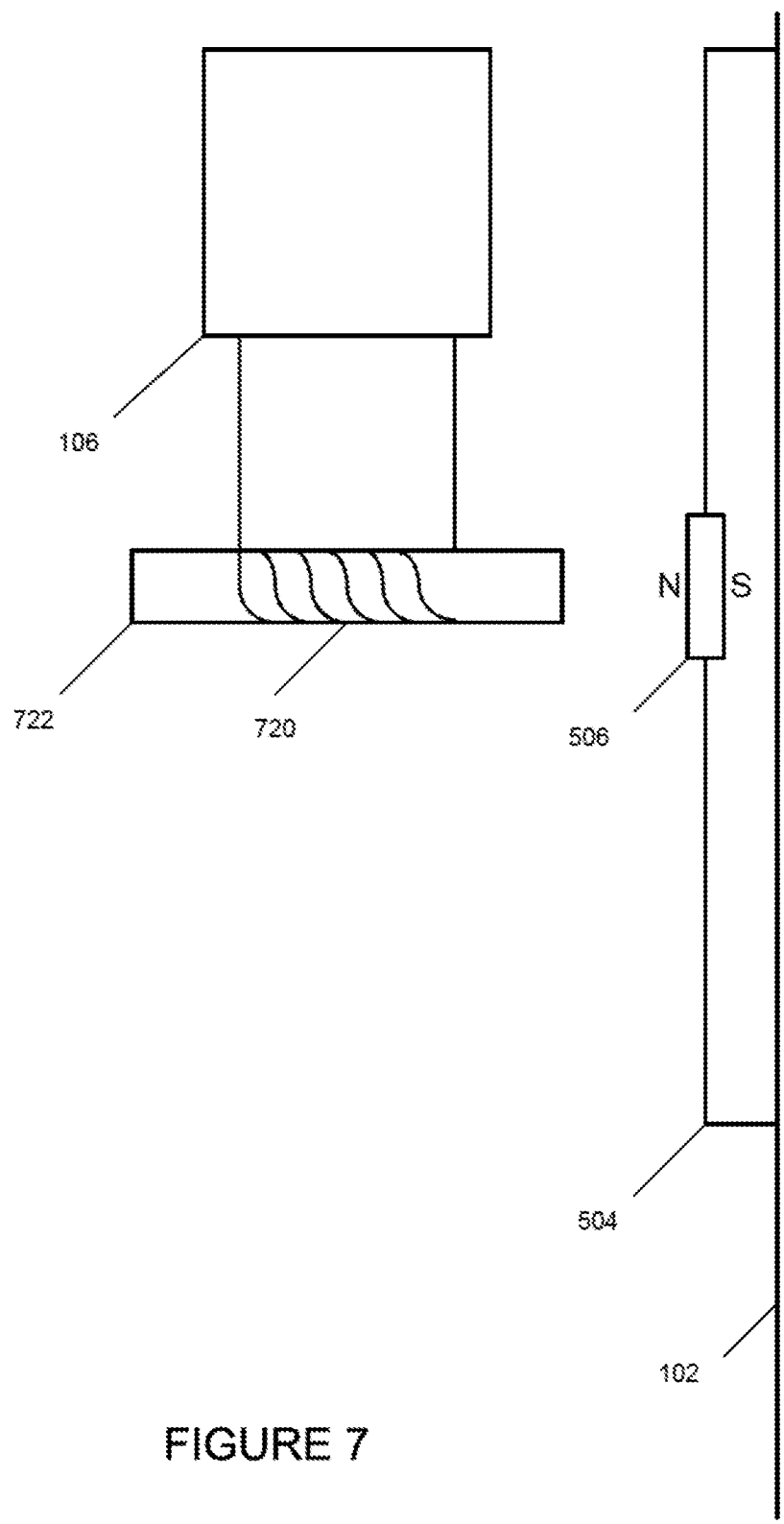
FIG. 7 is a schematic of a screen vibration system using a stationary electromagnet according to one example.

FIG. 7 depicts an example of a screen vibration system that uses a stationary electromagnet system. A coil 720 of wire is positioned on a core 722 and is oriented such that the end of the core 722 is directed towards the element 506. If the core 722 is of a material, such as iron, that is influenced by a magnetic field, a small amount of electrical current can be made to pass through the coil 720 by power supply 106 to create a magnetic field that can repel or attract the element 506. When the current through the coil 720 traveling in the reverse direction, the magnetic field can become opposite than before and can attract the element 506 instead of repelling (or repel instead of attracting, depending on setup). The screen displacement that results from forcing the element 506 to move by the magnetic field can displace the screen 102 in either direction.

The screen 102, when displaced outwards from the electromagnet formed by the coil 720 and core 722, may have less displacement from a rest position than when the screen 102 is displaced towards the electromagnet. This difference can be compensated for by increasing the electric current to the coil 720 such that there is more current going through the coil 720 when the coil 720 repels the element 506 than when the coil 720 is attracting the element 506. The current can be shaped into an asymmetrical waveform to provide a screen displacement that is equal in both directions from the rest position of the screen 102. One approach is to measure the screen displacement profile for a given signal waveform to the electromagnet and determine how the input signal is to be modified to provide the desired screen displacement. The modified waveform is then applied to the electromagnet to confirm the desired displacement profile has been achieved. A range finder sensor can be used to measure the screen displacement. Another approach to creating an asymmetrical waveform is to add a direct current bias in the amount that achieves an average screen displacement that is the same as the natural rest position of the screen.

Changing the magnetic field in the system in FIG. 7 can influence the element 506 associated with the screen 102. If the frequency of the changing magnetic field increases, the force exerted by the changing magnetic field may not be able to overcome the combined inertia of the screen 102, the batten 504, and the element 506 to make the screen 102 follow the changing magnetic field. If the maximum frequency that the vibration system (e.g., the magnetic system) is able to influence the screen 102 is too low, the inertia of the screen 102, the batten 504, and the element 506 can be reduced to raise the upper limit at which the screen 102 can be vibrated. Using more powerful electromagnets and electromagnetic drivers can also increase the upper limit at which the system is able to vibrate the screen 102. Screen tension may also be a factor in that the more tension there is on the screen 102, the amount of force needed to displace the screen 102 is greater. Reducing screen tension can help increase screen vibration displacement and increasing the screen vibration frequency. But too much reduction in screen tension can lead to other screen surface artifact problems such as screen sag.

When no current is passing through the coil 720 in FIG. 7, only the attractive magnetic force present can be from the element 506 to the core 722. This may create a slight residual force on the element that can pull the screen 102 slightly towards the core 722. One approach to reducing the residual force is to move the core 722 and coil 720 further away from the element 506 and use a higher electric current in the coil 720 to increase the magnetic field to compensate for the increased distance. Another approach can include changing the material from which the core 722 is made to a material that is not influenced by a magnetic field. Examples of these types of materials include plastic, aluminum and air. When a material that is not influenced by a magnetic field is used for the core 722, more current may be needed to achieve the same magnetic field strength compared to a core that is made from iron. The number of turns of wire used in the coil 720 can be increased to achieve a higher magnetic field. The coil 720 can be placed closer to the element 506 when a core that is not influenced by a magnetic field is used.

Figure 8:
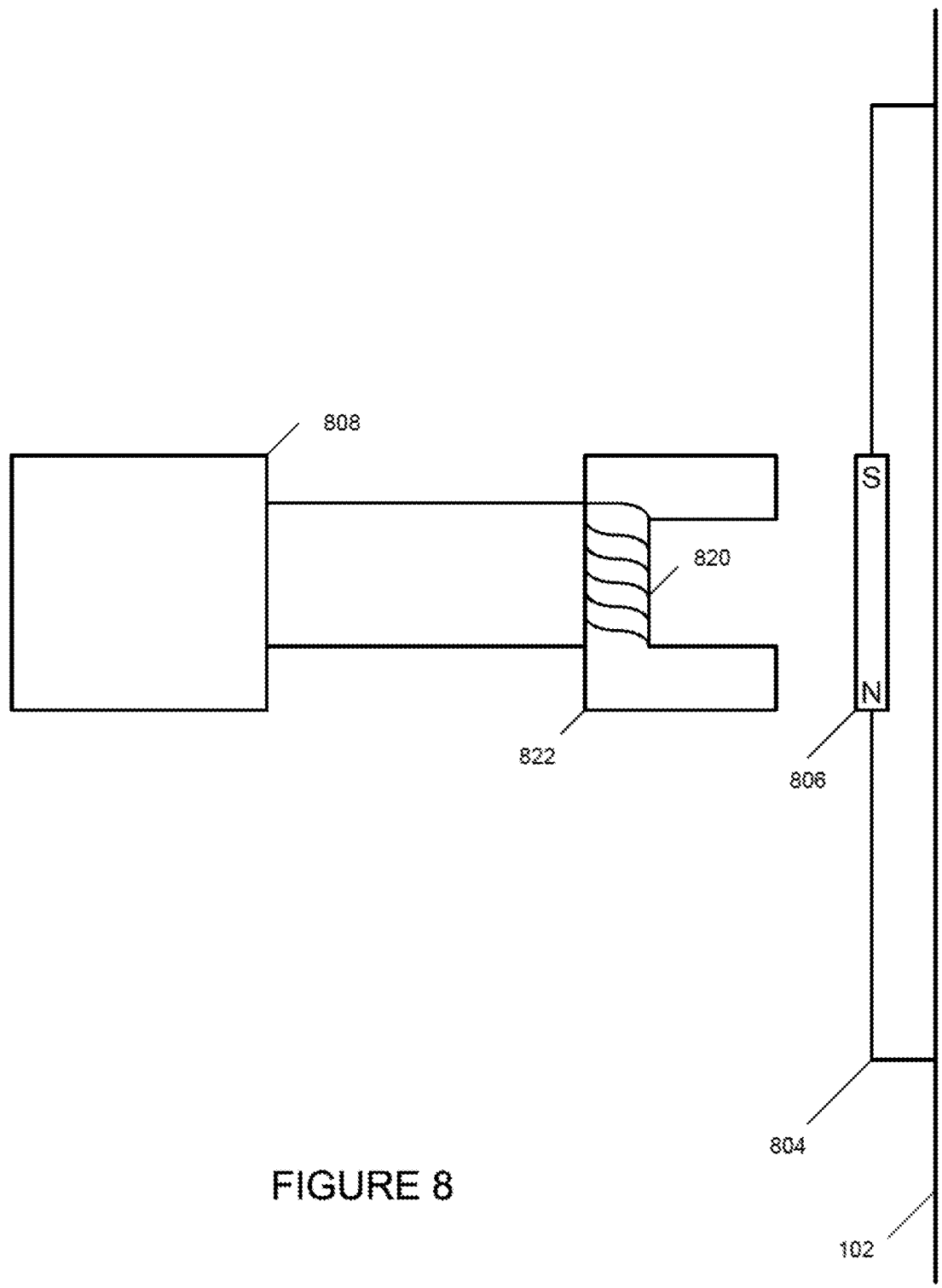
FIG. 8 is a schematic of a screen vibration system that includes a controller and a stationary electromagnet according to one example.

FIG. 8 shows an example of a screen vibration system with a controller 806 to control electrical current through an electromagnetic device that includes a coil 820 and a core 822. The magnetic flux path through air gaps can be significantly reduced to allow more efficient energy transfer from the actuating device (i.e., the coil 820 and the core 822) to a permanent magnet 806 and a batten 804 on the screen 802. Where there is more efficient magnetic coupling, the magnetic field can be more contained to provide better energy transfer to the screen 102 and can be performed by configuring the permanent magnet 806 on a screen batten 804 and the electromagnetic core 822 to form a more complete loop or closed loop with reduced air gap for the magnetic fields to pass through. The electromagnetic core 822 can be made from a metallic material that is influenced by a magnetic field. The metallic material may have a high relative permeability characteristic. Examples of metallic materials that have a high relative permeability can be ferromagnetic metals such as iron or Mu-metal. The air gaps in the magnetic flux path may be limited to the shorter paths between the ends of the core 822 and the permanent magnet 806. Energy efficiency of the vibration system can be improved by configuring the electromagnetic core and the permanent magnet on the screen batten so that there are no large air gaps at the open ends.

The elements 506, 806 described above can each be mounted in a batten 504, 804 to distribute the repelling and attractive forces exerted on the element 506, 806 over a larger area of the screen 102. For example, the length of the batten 504, 804 can be one foot to two feet long and one inch or more wide. For a screen with only a horizontal curvature and no vertical curvature, one or more battens can be mounted vertically on the back of the screen. The battens can be made of a light yet stiff material, such as balsa wood, carbon fiber, or a composite material. The element 506, 806 can be mounted on the surface of the batten 504, 804 or recessed in the batten 504, 804. The batten 504, 804 can be fastened to the screen 102 by adhesive that does not cause a deformity or a stain on the screen 102 to occur. The side of the batten 504, 804 towards the screen 102 can be black in color such that it is not visible if the screen 102 is perforated. Perforated screens may be used, for example, where audio loudspeakers are positioned behind the screens and the presentation sound can pass through the openings in the screen material.

Figure 9:
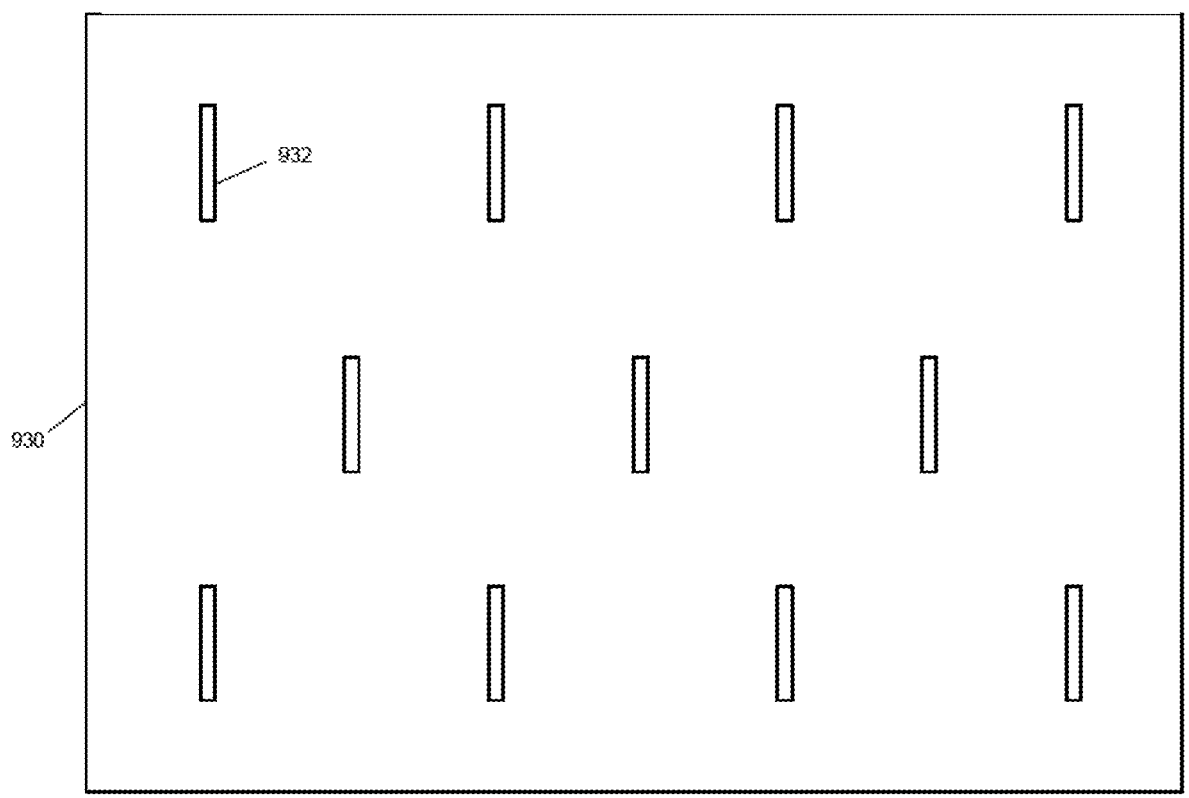
FIG. 9 is a back view of a screen with battens mounted on the screen according to one example.

FIG. 9 shows the locations of a possible batten distribution of battens 932 mounted onto a screen 930. The larger the screen the more battens can be used or needed.

A suitable power source can be used to power each coil for the locations where battens are located over the screen. One approach is to use one power source that powers all of the coils so that all of the coils vibrate at the same frequency and in phase. The screen vibrations, however, may have the same frequency and phase relationship, which can result in localized standing vibration wave patterns distributed over the screen. Standing wave vibrations may not be effective at reducing speckle because a component of the displaced screen is not moving and therefore may be unable to reduce speckle artifacts.

One approach that may be used to reduce or eliminate standing vibration waves is to power or drive each of the coils with a separate source such that each source generates random signals that are uncorrelated (also referred to as "de-correlated"). The random signals can be random in amplitude and in frequency, similar to pink or white noise. If the signal is random in amplitude and not in frequency, or random in frequency but not in amplitude, there may still be a standing component in the interactions of the waveforms from different sources. The signals from each of the vibration sources can be de-correlated in amplitude and in frequency. For example, each of the coils can be driven with a signal that has a different amplitude, frequency, and phase relationship than signals used to drive the other coils to reduce or eliminate the conditions that lead to standing waves or having a component of a standing wave.

Figure 10:
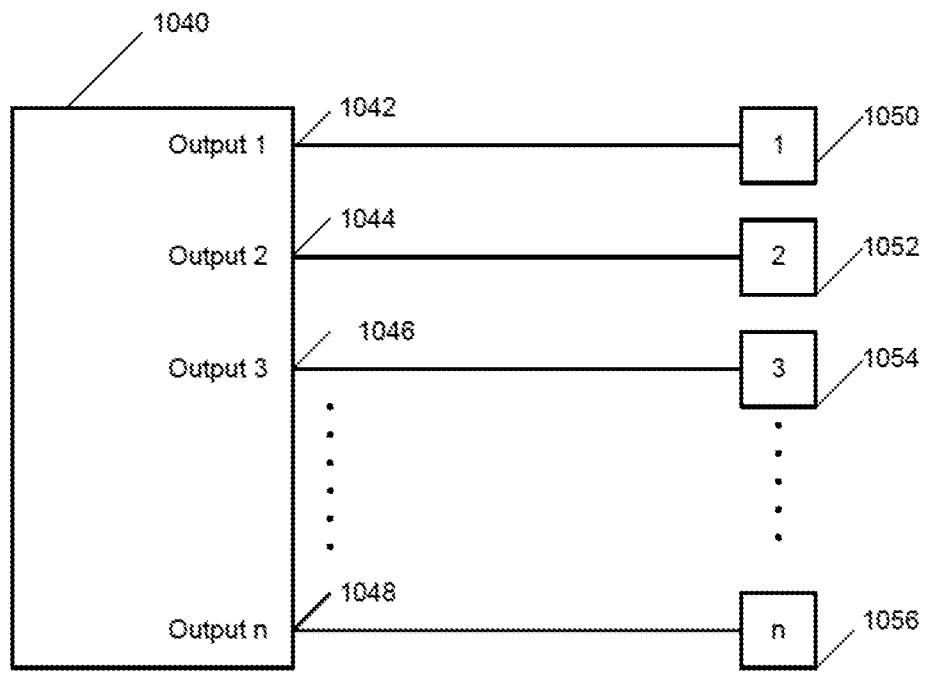
FIG. 10 is a schematic a coil driver configuration according to one example.

FIG. 10 schematically depicts an example of a coil driver configuration for a screen vibrations system. Each of the coils 1-$n$ 1050, 1052, 1054, 1056 can be electrically connected to an actuator driver power supply 1040. The actuator driver power supply is configured (such as by being designed) to have channel outputs 1042, 1044, 1046, 1048 to provide a signal for each coil. Each channel can be configured with its own frequency source in which the frequency source is a random frequency source, such as a pink or a white noise source. The bandwidth of the frequency source can be such that there are frequency components in the 20 Hz to 30 Hz range so that when the frequency source is filtered with a 20 Hz to 30 Hz bandpass filter there is signal content.

Figure 11:
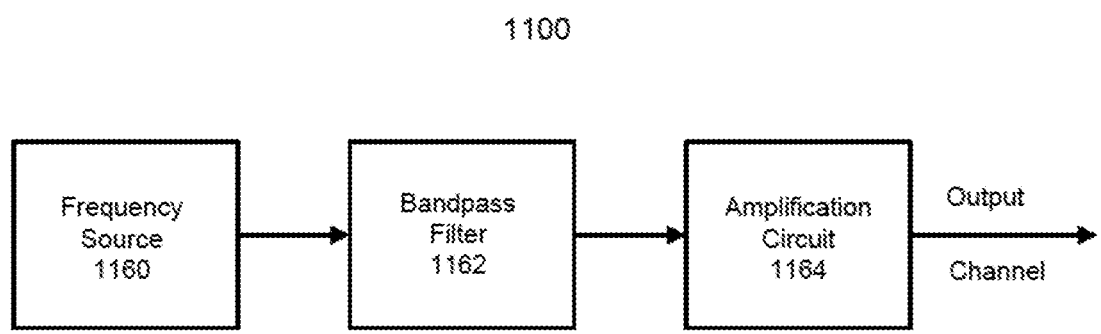
FIG. 11 is a block diagram of a system for outputting a signal on an output channel that is uncorrelated with other channels according to one example.

FIG. 11 shows a block diagram of system 1100 for outputting a signal on an output channel that is uncorrelated with other channels. Each of the channel outputs 1042, 1044, 1046, 1048 in FIG. 10 from the actuator driver power supply 1040 can be fed by separate systems within the actuator driver power supply 1040, an example of one of which is shown in FIG. 11. The frequency source 1160 can be a DSP or other type of signal processor in which a range of random frequencies can be produced, such frequencies corresponding to pink noise or white noise. A bandpass filter 1162 can filter the signal from the frequency source 1160 to remove unuseful portions of the signal for the screen vibration coil is used. A screen vibration range can be 20 Hz to 30 Hz, but it is not limited to this range. The filtered source signal is amplified with an amplification circuit 1164 so that the signal level is appropriate for the screen vibration coil. Each channel can have its own frequency source so that the signal from each channel can be uncorrelated. The same driver configuration can be used to drive other actuators in place of the coil 720 and the coil 820, in FIGS. 7 and 8 respectively, such as the actuator 104 or motor 508.

Certain examples of screen vibration systems disclosed here can be retrofitted onto existing theatre screens, including screens in theatres in which the projection system image light source has been changed from a non-coherent light source to a coherent light source, such as a laser light source.

Figure 12:
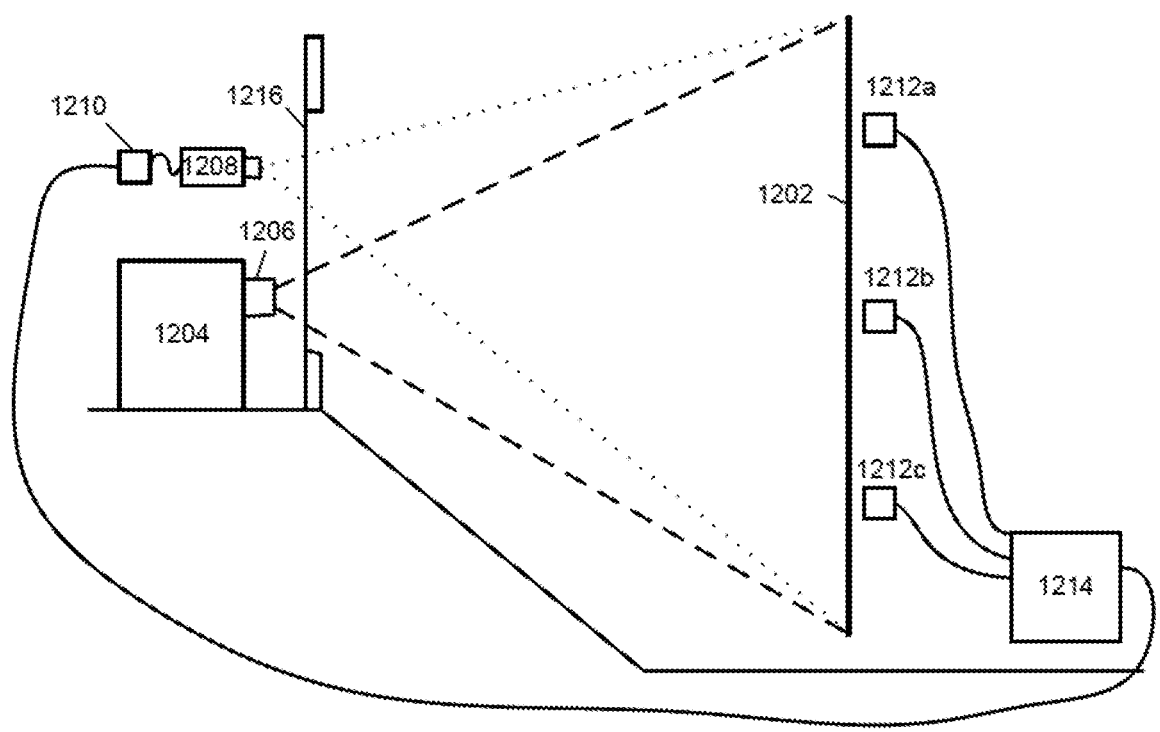
FIG. 12 is a schematic of a system for reducing speckle in a theatre according to one example.

To optimize speckle artifact reduction, a screen image monitoring system and feedback loop can be set up to adjust the amount of vibration or alter a vibration parameter applied to the screen vibrator. FIG. 12 shows a system that can be used to optimize speckle reduction in a theatre. A theatre screen 1202 may have a number of screen vibrators 1212a-c positioned behind the screen and that are controlled by a control unit 1214. The control unit 1214 can provide de-correlated drive signals to each of the vibrators 1212a-c such that the screen 1202 is vibrated by each vibrator and the screen vibrations can be de-correlated with respect to each other. When a projector 1204 is projecting light through the projection lens 1206 onto the screen 1202, a sensor 1208, such as a camera, can capture the projected light on the screen 1202. The captured image can be stored within the sensor 1208 or in a separate unit 1210. The separate unit 1210 can also process the camera image to analyze and determine or quantify the amount of speckle in the light on the screen 1202. The information from the separate unit 1210 can be communicated to the control unit 1214, which can provide the drive signal to each of the screen vibrators 1212a-c. The sensor 1208 can be located in the projection booth with the projector 1204 or the sensor 1208 can be positioned outside the projection booth such that the sensor 1208 is not required to view the screen 1202 through the booth window 1216. The separate unit 1210 can be on its own or part of the sensor 1208, part of the projector 1204, or part of the control unit 1214.

The process to optimize reducing speckle can be performed by projecting light onto the screen 1202 from the projector 1204. Projected light can be a projected pattern or it can be just one color projected over the whole screen area. For example, the light projected onto the screen 1202 can be blue, red, or green. The optimization can be performed for one color, such as green light, in which speckle artifacts are known to be more apparent or the optimization can be performed to ensure speckle artifacts reduction is optimized in consideration of all light colors. The optimization to reduce speckle can be performed before a day of shows or scheduled to reoccur over a longer period of time. The sensor 1208 can be a camera that captures the projected light pattern intended for speckle reduction. The captured image could be processed and analyzed for the amount of speckle present by the separate unit 1210. The amount of speckle can be determined globally for the screen 1202 or the speckle can be determined for more localized areas of the screen 1202, such as the screen areas influenced by the vibrators 1212a-c. Based on predetermined criteria as to the amount of speckle that is acceptable compared to the amount of speckle present, the control unit 1214 can be influenced by the information from the separate unit 1210 to change the signal to the vibrators 1212a-c to achieve the speckle reduction required.

Figure 13:
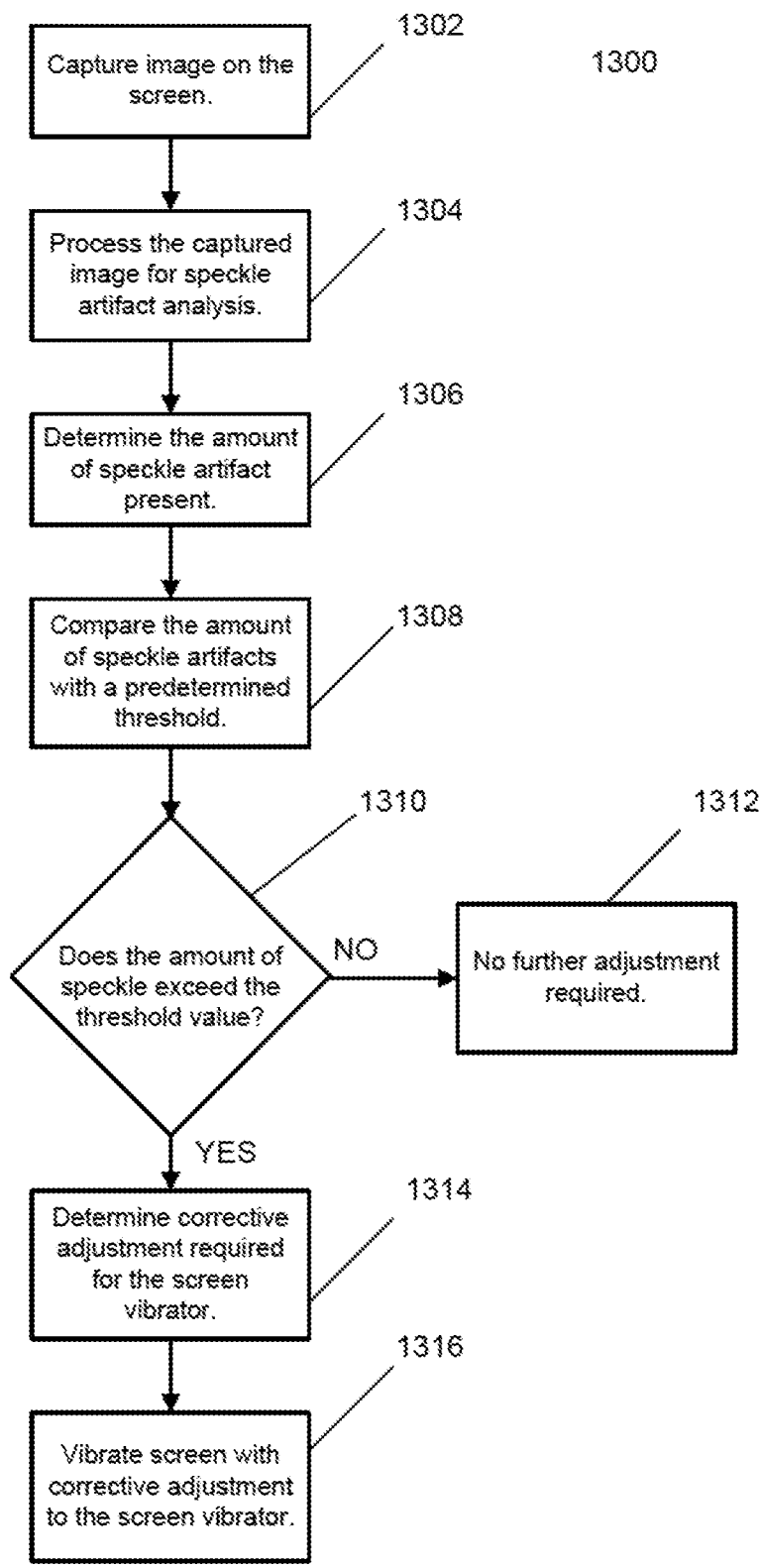
FIG. 13 is a flow chart of a process for reducing speckle according to one example.

An example of a process 1300 to reduce speckle artifacts is shown as a flow chart in FIG. 13. The process 1300 is described with reference to the system diagram shown in FIG. 12, but other implementations are possible. In block 1302, the image light on the screen 1202 is captured with the sensor 1208. In block 1304, the separate unit 1210 processes the captured image for speckle artifact analysis. Processing the captured image for speckle artifact analysis may include low-frequency filtering of the image to further isolate speckle artifacts. In block 1306, the separate unit 1210 determines the amount of speckle artifacts present on the screen 1202 from the processed information. In block 1308, a comparison of the present amount of speckle artifact is made with a threshold level. In decision block 1310, further action is determined based on this comparison. If the present amount of speckle does not exceed a threshold, no further adjustment is required as in block 1312. If the present amount of speckle exceeds acceptable limits, then a corrective adjustment to be applied to one or more of the screen vibrators 1212a-c is determined in block 1314. One or more of the screen vibrators 1212a-c receives the corrected vibration signal and the screen 1202 is vibrated with a corrective adjustment to the screen vibrator(s) in block 1316. The process 1300 of FIG. 13 can be repeated to determine if the corrective adjustment has reduced the amount of speckle to within the predetermined threshold limit. If, after a predefined number of iterations of the process 1300, the amount of speckle is not reduced to within the predetermined threshold limits, the condition can be flagged. When flagged, other factors such as repositioning of a screen vibrator can be considered. Re-positioning can be performed manually or with a vibrator system as described in FIG. 14 that is automated.

Screen vibrators may need to be repositioned over time to maintain an optimum distance between the vibrator and the screen. A vibrator or vibrator assembly that is hard mounted to the screen frame or other connection point may not be adjustable to accommodate changes in distance between the vibrator and the screen that may occur over time or with a change in temperature and humidity.

Figure 14:
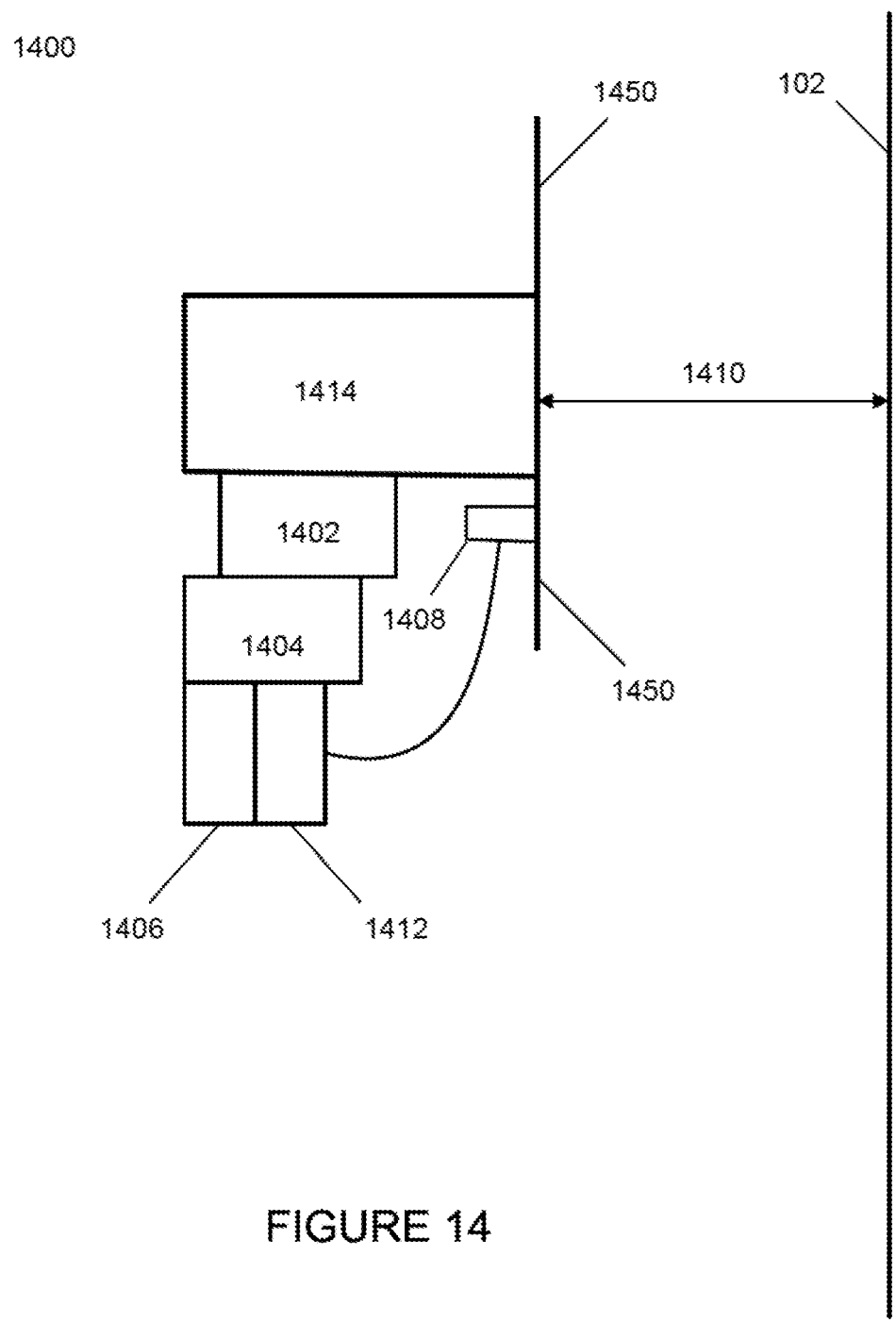
FIG. 14 is a schematic of an automatically adjustable screen vibration system according to one example.

An adjustable configuration 1400 shown in FIG. 14 has a vibrator assembly 1414 with a baffle 1450 and can be mounted onto a movable portion 1402 of a platform assembly where the stationary portion 1404 of the platform assembly is mounted to the screen structure (not shown). The platform assembly can have a motor or actuator 1406 that can be commanded to move the movable portion 1402 of the platform to move the vibrator assembly 1414 closer or further away from the screen 102. The vibrator assembly 1414 and baffle 1450 may be replaced with a non-acoustical electromagnetic actuator assembly, examples of which are described in FIGS. 5, 7 and 8.

In another configuration, the distance between the vibrator and the screen can be adjusted by mounting the vibrator assembly so that it can move, slide or pivot small distances closer or further away from the screen. By controlling with a motor or actuator the amount of move, slide, or pivot of the vibrator assembly with respect to the screen, the distance between the vibrator and the screen can be adjusted. A pantograph mechanism may also be employed to allow the vibrator assembly to be repositioned with respect to the screen while maintaining a constant angular relationship with the screen.

In the automated adjustment system shown in FIG. 14, a distance sensing device 1408 can be mounted on the vibrator assembly 1414 to determine the distance 1410 that the vibrator assembly 1414 is from the screen 102. The distance sensing device 1408 can be an ultrasonic distance sensor or a distance sensor that utilizes alternate distance sensing technology. A processor within the controller assembly 1412 can be used to receive distance information from the distance sensing device 1408 and determine whether or not the vibrator assembly 1414 is within the acceptable distance range from the screen 102. If the distance 1410 is not acceptable, the processor commands the motor driver in the controller assembly 1412 to make the actuator 1406 move the movable portion of the platform with the vibrator assembly 1414 attached until it is within an acceptable distance range between the vibrator assembly 1414 and the screen 102. If the vibrator assembly 1414 remains in the acceptable distance range from the screen 102, the processor may command the controller assembly 1412 to hold the current motor position.

Each screen vibrator can be configured to be automatically adjusted between the screen and the vibrator. In another example, only the screen vibrators in screen locations where there is a greater tendency for the distance between the screen and the vibrator to change over time. For example some portions of the screen can experience more sag with time than other portions of the screen and therefore the vibrators positioned with portions of the screen experiencing more sag can be configured so the distance between the vibrator assemblies and the screen can be adjusted. In one configuration, vibrators positioned at the lower portion of the screen can be vibrators in which their distance to the screen can be adjusted.

In another example, the position between the vibrator and the screen can be optimized in a screen tuning process. For example, the system in FIG. 12 can be designed by configuring screen vibrators 1212*a-c* to be adjustable vibrators of a configuration described in FIG. 14. The controller assembly 1412 can be configured to receive information based on the amount of speckle from the separate unit 1210 or the control unit 1214 in FIG. 12. In a screen tuning process, the information received from the separate unit 1210 or the control unit 1214 can be commands to change the distance between the vibrator and the screen to optimize reducing speckle and minimize the amount displacement in the screen vibration. The speckle reducing optimization and screen tuning process can occur as part of a daily system calibration, or before each presentation or during a presentation or as required.

In another example, the signal from the distance sensing device 1408, on the vibrator assembly 1414 in FIG. 14 can be provided to the control unit 1214 of FIG. 12 to control the amplitude of the signal to the corresponding vibrator by the control unit 1214 to maintain a screen vibration that compensates for changes in distance between the vibrator and the screen.

In an alternate configuration where multiple screen vibrators are used and are all driven by substantially the same non-decorrelated signal, standing wave artifacts can be minimized by keeping each screen vibrator a certain distance away from adjacent screen vibrators, such that the respective vibration displacement waves have minimal interference with one another. The distance between each screen vibrator can also be as close as needed to ensure there are no areas on the screen that do not receive the adequate amount of vibration but not too close of a distance to create visible standing waves that form as a result of the interference of the two waves from the two adjacent screen vibrators. Where a screen vibration speckle reduction feedback loop is being used, the global speckle artifact reduction can be optimized for a common vibrator drive signal. Optimization can also include adjusting the amplitude of the drive signal to a different level for each screen vibrator even though all the vibrators are driven at the same frequency.

The foregoing description of the aspects, including illustrated aspects, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention.

What is claimed is:

1. A method for reducing speckle artifacts, the method comprising:
    vibrating a screen by a screen vibrator;
    capturing information about a projected image on the screen using a sensor;
    determining, by a processing unit, an amount of speckle artifacts present in the projected image on the screen from the information;
    comparing, by the processing unit, the amount of speckle artifacts present in the projected image on the screen determined from the information to a predetermined threshold;
    determining, by the processing unit, that the amount of speckle artifacts exceeds the predetermined threshold; and
    in response to determining, by the processing unit, that the amount of speckle artifacts exceeds the predetermined threshold, adjusting, by a controller using information from the processing unit, a signal to the screen vibrator that drives the screen vibrator.

2. The method of claim 1, further comprising:
    repositioning the screen vibrator by changing a distance between the screen vibrator and the screen.

3. The method of claim 2, wherein repositioning the screen vibrator by changing the distance between the screen vibrator and the screen reduces speckle artifacts.

4. The method of claim 2, further comprising:
    controlling the distance between the screen vibrator and the screen in response to determining that the amount of speckle artifacts exceeds the predetermined threshold.

5. The method of claim 1, wherein adjusting, by the controller using information from the processing unit, the signal that drives the screen vibrator in response to determining that the amount of speckle artifacts exceeds the predetermined threshold comprises:
    determining a corrective adjustment for the amount of speckle artifacts to be below the predetermined threshold; and
    changing the signal to the controller in accordance with the corrective adjustment to drive the screen vibrator such that the speckle artifacts are below the predetermined threshold.

6. The method of claim 1, wherein determining the amount of speckle artifacts present in the projected image on the screen from the information comprises:
    processing the information by performing low-frequency filtering of the information to isolate the speckle artifacts in the information.

7. The method of claim 1, wherein determining the amount of speckle artifacts present in the projected image on the screen from the information comprises:
    determining the amount of speckle artifacts only for a portion of projected image that is projected at a part of the screen associated with the screen vibrator.

8. The method of claim 1, wherein determining the amount of speckle artifacts present in the projected image on the screen from the information comprises:
    determining the amount of speckle artifacts for all or substantially all of the projected image that is projected onto the screen.

9. A projection system, comprising:
    a projector configured for projecting a projected image on a screen;
    a screen vibrator positionable with respect to the screen for vibrating the screen;

a controller configured for driving the screen vibrator to vibrate the screen; and a sensor configured for capturing information about the projected image on the screen;

a processing unit configured for:

determining an amount of speckle artifacts present in the projected image on the screen from the information;

comparing the amount of speckle artifacts present in the projected image on the screen from the information to a predetermined threshold; and determining that the amount of speckle artifacts exceeds the predetermined threshold, wherein the controller is configured for, in response to the processing unit determining that the amount of speckle artifacts exceeds the predetermined threshold, adjusting, using information from the processing unit, a signal to the screen vibrator to change a vibration characteristic of the screen vibrator.

10. The projection system of claim 9, wherein the screen vibrator is repositionable with respect to the screen by changing a distance between the screen vibrator and the screen.

11. The projection system of claim 10, wherein the screen vibrator is repositionable with respect to the screen by changing the distance between the screen vibrator and the screen to reduce speckle artifacts in the projected image.

12. The projection system of claim 10, wherein the distance between the screen vibrator and the screen is controllable in response to determining that the amount of speckle artifacts exceeds the predetermined threshold.

13. The projection system of claim 9, wherein the processing unit is further configured for:

determining a corrective adjustment for the amount of speckle artifacts to be below the predetermined threshold; and changing the information to the controller in accordance with the corrective adjustment to drive the screen vibrator such that the amount of speckle artifacts is below the predetermined threshold.

14. The projection system of claim 9, wherein the processing unit is configured for determining the amount of speckle artifacts present in the projected image on the screen from the information by:

processing the information by performing low-frequency filtering of the information to isolate the speckle artifacts in the information.

15. A subsystem for a projection system, the subsystem comprising:

a controller configured for driving a screen vibrator positionable with respect to a screen for vibrating the screen;

a processing unit configured for:

determining an amount of speckle artifacts present in a projected image on the screen from captured information received from a sensor;

comparing the amount of speckle artifacts present in the projected image on the screen from the captured information to a predetermined threshold; and determining that the amount of speckle artifacts exceeds the predetermined threshold, wherein the controller is configured for, in response to determining that the amount of speckle artifacts exceeds the predetermined threshold, adjusting, using information from the processing unit, a signal to the screen vibrator to change a vibration characteristic of the screen vibrator.

16. The subsystem of claim 15, wherein the screen vibrator is repositionable with respect to the screen by changing a distance between the screen vibrator and the screen.

17. The subsystem of claim 16, wherein the screen vibrator is repositionable with respect to the screen by changing the distance between the screen vibrator and the screen to reduce speckle artifacts in the projected image.

18. The subsystem of claim 16, wherein the distance between the screen vibrator and the screen is controllable in response to determining that the amount of speckle artifacts exceeds the predetermined threshold.

19. The subsystem of claim 15, wherein the processing unit is further configured for:

determining a corrective adjustment for the amount of speckle artifacts to be below the predetermined threshold; and changing the information to the controller in accordance with the corrective adjustment to drive the screen vibrator such that the amount of speckle artifacts is below the predetermined threshold.

20. The subsystem of claim 15, wherein the processing unit is configured for determining the amount of speckle artifacts present in the projected image on the screen from the captured information by:

processing the captured information by performing low-frequency filtering of the captured information to isolate the speckle artifacts in the captured information.

* * * * *